April 10, 1951     L. M. THAYER     2,548,328
FISHING POLE HOLDER
Filed May 19, 1948
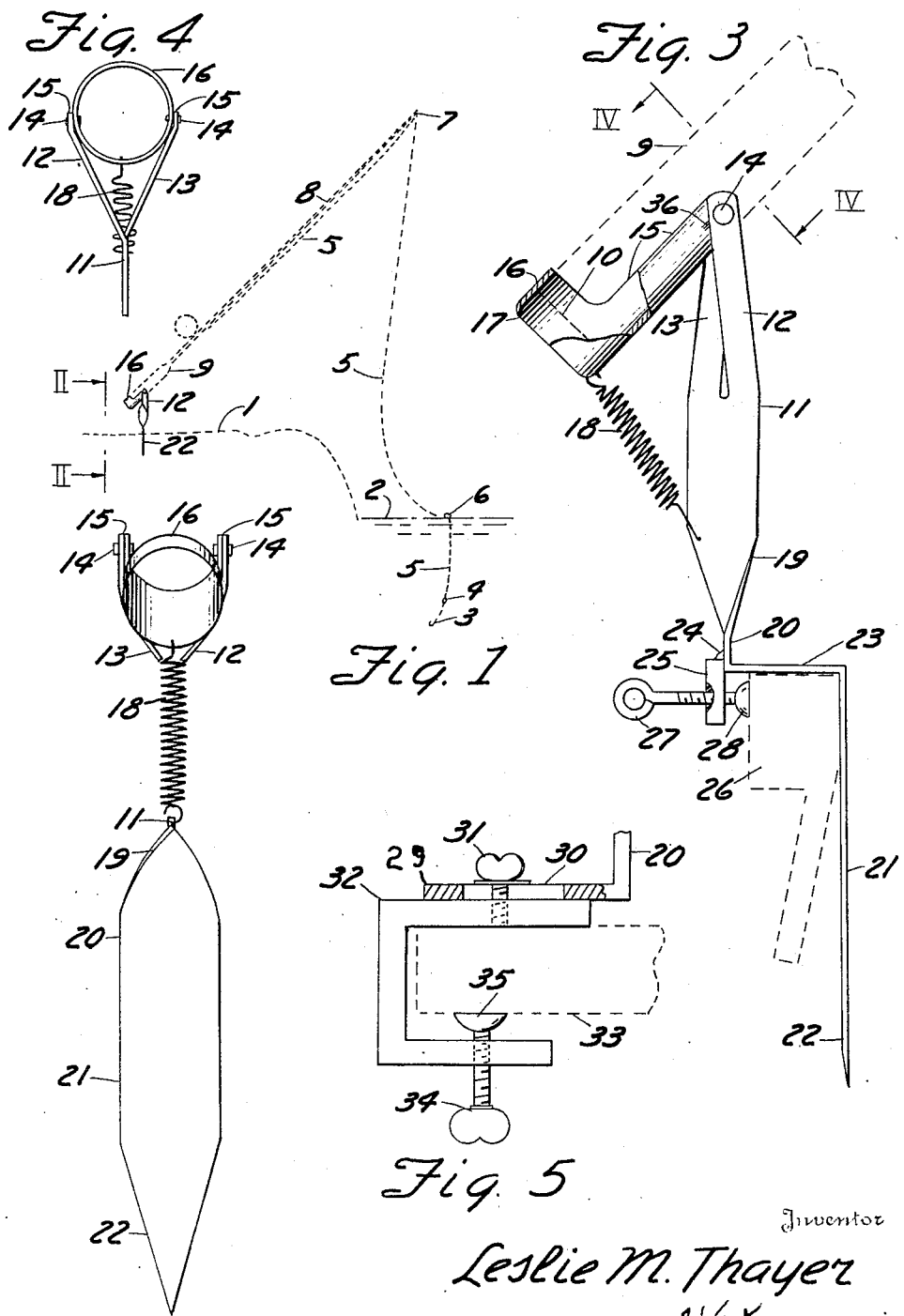

Patented Apr. 10, 1951

2,548,328

UNITED STATES PATENT OFFICE 2,548,328

FISHING POLE HOLDER

Leslie M. Thayer, Toledo, Ohio

Application May 19, 1948, Serial No. 27,852

1 Claim. (Cl. 248—42)

This invention relates to socket supporting means or holders, as for staffs, rods, poles and the like, to project from such means to have a weight portion of the item so supported to lock itself and as strain be applied in the direction of the self-locking weight strain, to resist ready removal.

This invention has utility when incorporated in equipment for anglers, especially in the field of fish-snagging holders for fishing line poles, thereby enlarging the active range of the fisherman by the use of a compact accessory adapted for convenient packing and handling with normal tackle outfits.

Referring to the drawings:

Fig. 1 is a view of an embodiment of the invention anchored in a waterside bank, with a fishing pole and line in dotted lines extending therefrom;

Fig. 2 is a view of the holder on an enlarged scale, looking from the line II—II, Fig. 1;

Fig. 3 is a side view of a departure in construction for the holder of Fig. 2, while retaining as offset, the thrust point or bank anchor for streamside use, also embodying a clamp adapted to anchor, say with the top of a boat side;

Fig. 4 is a view looking from the line IV—IV, Fig. 3, showing the socket detail of the holder; and Fig. 5 is a fragmentary view, on a somewhat enlarged scale of anchoring means, omitting the thrust point feature of Figs. 2, 3, and substituting for the clamp of Fig. 3, an adjustable swivel clamp.

A waterside bank 1 for water 2 has fish hook 3 adjacent sinker 4 on a line 5 extending downward from a float 6 and upward to a tip 7 of a fishing pole or flexible rod 8 having a grasp portion or grip 9 ending in a ferrule portion 10.

A body for the holder is herein shown of rigid strap metal say of ⅛" thick stock 1" wide providing a medial, in-use upright, with a portion 11 to a bifurcated top of forks 12, 13, swung to have pivots 14 align in swingably mounting trough sides 15 of an open ended socket ring 16 at its free end having a slightly less diameter or inward rim 17.

Downwardly extending to make an approximately 30° angle with the body portion 11 is a tension helical spring 18. A spring adopted as responding for use on inland lakes and streams, say with a 4½' length metal rod, has the helices of the spring ⅜" in diameter for a region of 2½", subject to about 1" extension with 6# direct pull on such spring.

A 90° twist 19 downward from the body portion 11 may have a portion 20 approximately in the plane of the axis of the pivots 14. For the holder anchorage, a length-providing portion 21 may terminate in a tapered portion or point 22, adapted for forcible thrusting into the stream bank 1, in providing adequate firmness for holding the line pole 8 upwardly directed, say in the range of 45° to have some overhang as to the water 2. The greater-by-far weight portion for the pole and line as on the side of the pivots 14 away from the socket ring 16 tends effectively to lodge and anchor the ferrule 10 in the ring as a seat. The spring 18 between the ring 16 underside and the body portion 11, not only sustains the upward normal direction for the pole or rod 8 toward its tip 7, but is a yieldable resistance responding to pull on the line 5 to hold the line taut as a fish may pull thereon. The experience in fishing with the line 8 thus maintained taut is that the fish pull is not always steady or in the same direction. Accordingly, it follows that any course speed or direction change by the fish, does not release the hook 3, but, as the fish may attempt to get free of such hook 3, the relative freedom given the hook by such attempt promotes snagging action by the hook as brought about by the spring 18.

An advantageous way to extend the field for use of the holder or pole anchor device is to have an offset 23 (Fig. 3) for the bank stabbing tine and point 21, 22. A weld 24 for a block portion 25 opposed to the portion 21, forms a channel to ride, say over a top 26 of a boat side. At the block 25 on the boat inside is an eye-bolt 27 extending thru the block 25 to carry an adjustable head 28 adapted as a rocking face for a clamp. The unit holder may be taken from the tackle kit and thus provide ready mounting, say for an extra pole and line, for the one fishing from a boat, instead of a streamside bank.

The adaptability may be still further widened, by an offset 29 (Fig. 5), reverse to the offset 23. The offset 29 is shown as having a slot 30 with a wing bolt 31 to a C-clamp element 32 adapted to be placed astride an edge of a boat seat 33. The C-element may be lock mounted by a wing bolt 34 having a rockable head 35 to engage the underside of the seat or other object. The screw or bolt 31 at the slot 30 not only permits adjustment of the extent of overlap for the offset 29, but allows the portion 20 and the holder therewith to be moved angularly relatively to the bolt 31 as an axis. There is thus herein a swivel mounting for the holder unit. For instance, one rowing a boat may mount the holder to have the pole 8 extend to one side or rearward, say as in trolling.

The upward direction, suggested as 45° for the pole 8 as controlled by the seat or trough and ring socket 15, 16, desirably has its swing limit fixed as toward the support or strap body member 20, by a stop 36 as an outwardly projecting portion from a side of the trough 15 to abut a side of the fork tine 12.

Any pull on the line 5 transmitted to the upper end of the pole 8, is generally of a downward direction, and accordingly makes more positive the holding of the seat or socket on the grip 9 having its major portion exposed. This exposed region is sufficient that the fisherman may grasp the grip 9 with firmness and as so definitely held, remove from the holder.

What is claimed and it is desired to secure by Letters Patent is:

In a fishing pole holder, a ring having a less internal diameter lower end and from its upper end lower portion an approximately half cylindrical extension forming an open top channel, there being at the upper portions of the channel remote from the ring a pair of aligned pivot bearings defining an axis parallel to the horizontal diameter of the ring, a mounting stem having an upwardly open fork astride the channel under side and connected to the pivot bearings in providing a fixed fulcrum at the axis for a pole therein to have an axis of rocking therethru in the vicinity of a horizontal diameter of the pole in the region of the fulcrum axis, the pole grip portion being nested downwardly past the fulcrum axis to be held by the less internal diameter lower end of the ring from extending therebeyond in providing a stable seating for the pole in the holder, and means for yieldingly tilting the holder channel in its extent away from the pivot bearings, said means comprising a downwardly pitched tension helical spring directly connected between the ring and stem adjacent the base of the fork for the pole grip end to be held in the channel and the pole body away from the grip and beyond the fulcrum bearings to act in holding the pole end seated in the ring, from which holding hand grasp on the pole just clear of the fulcrum may serve to swing the pole upward on the ring as an axis to clear the pole of the channel to be then drawn from the ring.

LESLIE M. THAYER.

REFERENCES CITED

The following references are of record in the file of this patent:

UNITED STATES PATENTS

| Number | Name | Date |
|---|---|---|
| 278,124 | Gause | May 22, 1883 |
| 729,485 | Briner | May 26, 1903 |
| 1,608,795 | Kennedy | Nov. 30, 1926 |
| 2,089,452 | Utley | Aug. 10, 1937 |
| 2,204,692 | Parisio | June 18, 1940 |
| 2,238,127 | Nissen | Apr. 15, 1941 |
| 2,289,592 | Riedi | July 14, 1942 |
| 2,427,600 | Hanke | Sept. 16, 1947 |

FOREIGN PATENTS

| Number | Country | Date |
|---|---|---|
| 557,514 | France | Aug. 10, 1923 |